US008079459B2

(12) United States Patent
Burgermeister

(10) Patent No.: US 8,079,459 B2
(45) Date of Patent: Dec. 20, 2011

(54) TRANSPORT APPARATUS

(75) Inventor: William Burgermeister, Freehold, NJ (US)

(73) Assignee: The Unites States of America as represented by the Secretary of the Army, Washington, DC (US)

( * ) Notice: Subject to any disclaimer, the term of this patent is extended or adjusted under 35 U.S.C. 154(b) by 215 days.

(21) Appl. No.: 12/622,300

(22) Filed: Nov. 19, 2009

(65) Prior Publication Data

US 2011/0114446 A1 May 19, 2011

(51) Int. Cl.
*B65G 47/34* (2006.01)

(52) U.S. Cl. .................................. 198/468.8; 198/468.6

(58) Field of Classification Search ............. 198/468.01, 198/468.6, 468.8, 468.9; 187/270
See application file for complete search history.

(56) References Cited

U.S. PATENT DOCUMENTS

| | | | | | |
|---|---|---|---|---|---|
| 4,723,356 | A * | 2/1988 | Sakamoto et al. | ......... | 198/468.8 |
| 4,921,398 | A * | 5/1990 | Fluck | ......... | 198/468.9 |
| 6,729,462 | B2 * | 5/2004 | Babbs et al. | ......... | 198/468.8 |
| 7,137,593 | B2 * | 11/2006 | Baatz | ......... | 198/468.8 |
| 7,641,041 | B1 * | 1/2010 | Liu et al. | ......... | 198/468.8 |
| 7,954,624 | B2 * | 6/2011 | Yamasaki et al. | ......... | 198/468.6 |

* cited by examiner

*Primary Examiner* — James R Bidwell
(74) *Attorney, Agent, or Firm* — John F. Moran

(57) ABSTRACT

A transporter may move a payload along a linear path. The transporter may include a stationary base and a first arm assembly. The first arm assembly may include a first gear coupled to the stationary base, an idler gear that meshes with the first gear, and a second gear that meshes with the idler gear. The transporter may include a driver for rotating the first arm assembly around the axis of the first gear. A second arm assembly may be rigidly coupled to the second gear such that rotation of the second gear rotates the second arm assembly around the axis of the second gear. The second arm assembly may include a third axis that is parallel to the axes of the first and second gears. A payload engager may be disposed at the third axis, for engaging and disengaging the payload.

15 Claims, 18 Drawing Sheets

TRANSPORT APPARATUS

STATEMENT OF GOVERNMENT INTEREST

The inventions described herein may be manufactured, used and licensed by or for the U.S. Government for U.S. Government purposes.

BACKGROUND OF THE INVENTION

The invention relates, in general, to apparatus for moving objects, and, in particular, to apparatus for moving objects along a linear path.

SUMMARY OF THE INVENTION

It is an object of the invention to provide an apparatus for moving objects along a linear path.

An aspect of the invention is a transporter for moving a payload along a linear path. The transporter may include a stationary base and a first arm assembly. The first arm assembly may include a first gear coupled to the stationary base, an idler gear that meshes with the first gear, and a second gear that meshes with the idler gear. The first and second gears may include parallel axes. A gear ratio of the first gear to the second gear may be 2:1.

The transporter may include a driver for rotating the first arm assembly around the axis of the first gear. A second arm assembly may be rigidly coupled to the second gear such that rotation of the second gear rotates the second arm assembly around the axis of the second gear. The second arm assembly may include a third axis that is parallel to the axes of the first and second gears wherein a distance between the first gear axis and the second gear axis is a same distance as a distance between the second gear axis and the third axis. A payload engager may be disposed at the third axis, for engaging and disengaging the payload.

Another aspect of the invention is a payload storage and transport system. The payload storage and transport system may include a transporter and a storage assembly disposed adjacent the transporter. The storage assembly may include at least one retention slot disposed at a first end of a track.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

Embodiments of the invention may be useful for moving or transporting objects along a defined path. The objects may be anything, including containers with or without contents therein. In the description of the various embodiments herein, the objects being moved are referred to as "payloads."

Figure 1:
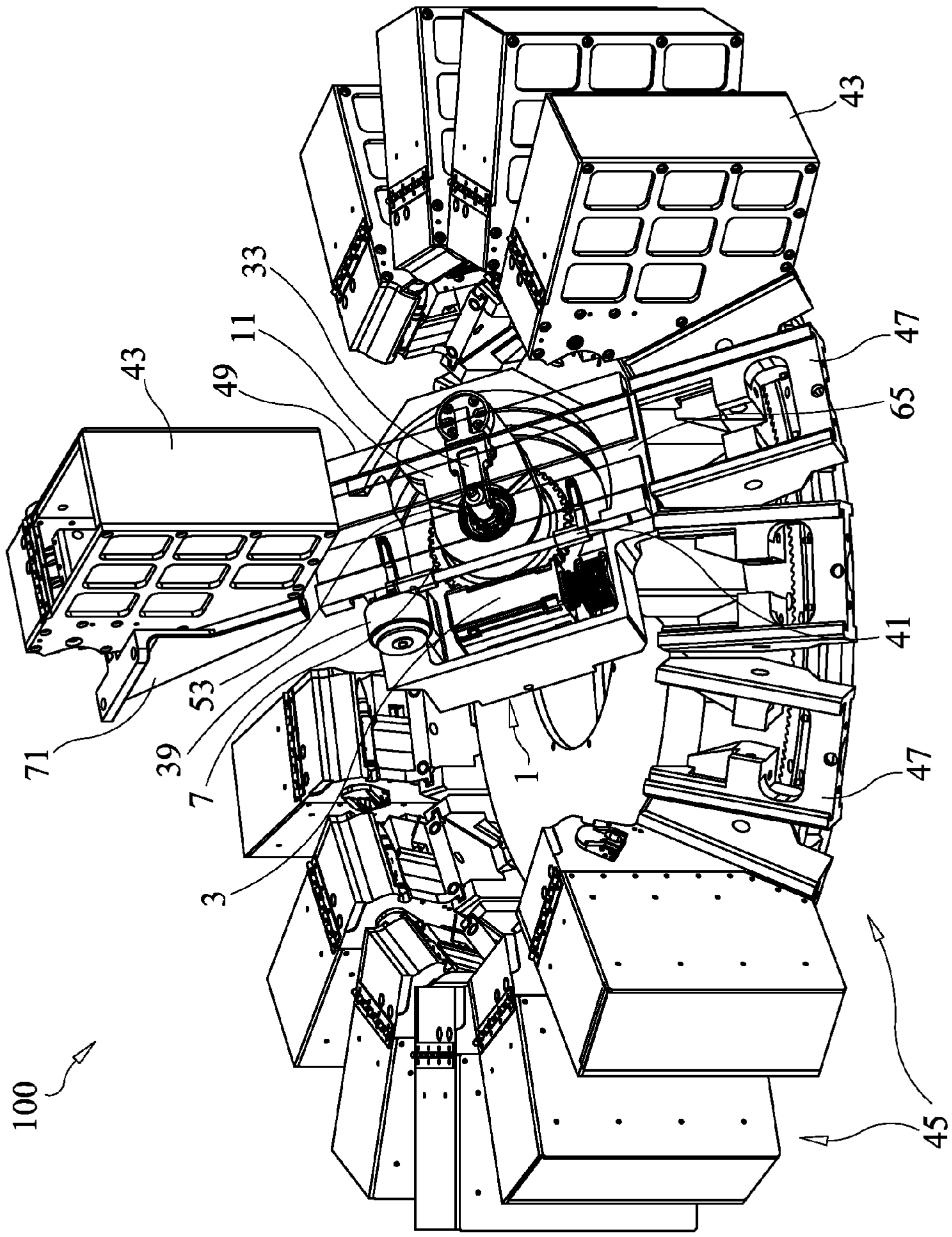
FIG. 1 is a partially transparent, perspective view of an embodiment of a payload storage and transport system, including a transporter, payloads, and a storage assembly which may have a curved shape.

FIG. 1 is a partially transparent, perspective view of an embodiment of a payload storage and transport system 100 that may include a transporter 1, a storage assembly 45, and one or more payloads 43. For clarity, the track 49 appears transparent in FIGS. 1 and 2. Payloads 43 may, in general, have any shape or size. The transporter 1 and storage assembly 45 may be positioned relative to one another to enable loading and unloading of payloads 43 from the storage assembly 45. One of the transporter 1 and the storage assembly 45 may be movable relative to the other, or both the transporter 1 and the storage assembly 45 may be movable. Storage assembly 45 may include retention slots 47 for storing payloads 43. A payload 43 may be removed from a retention slot 47 of the storage assembly 45, transported up (or down) the track 49 by the transporter 1 to a "use slot" 71, and returned to the retention slot 47. Transporter 1 may transport one or more payloads 43 in a linear path, for example, along parallel rails 51 of a track 49. Retention slot 47 and use slot 71 may also include parallel rails 51.

Figure 2:
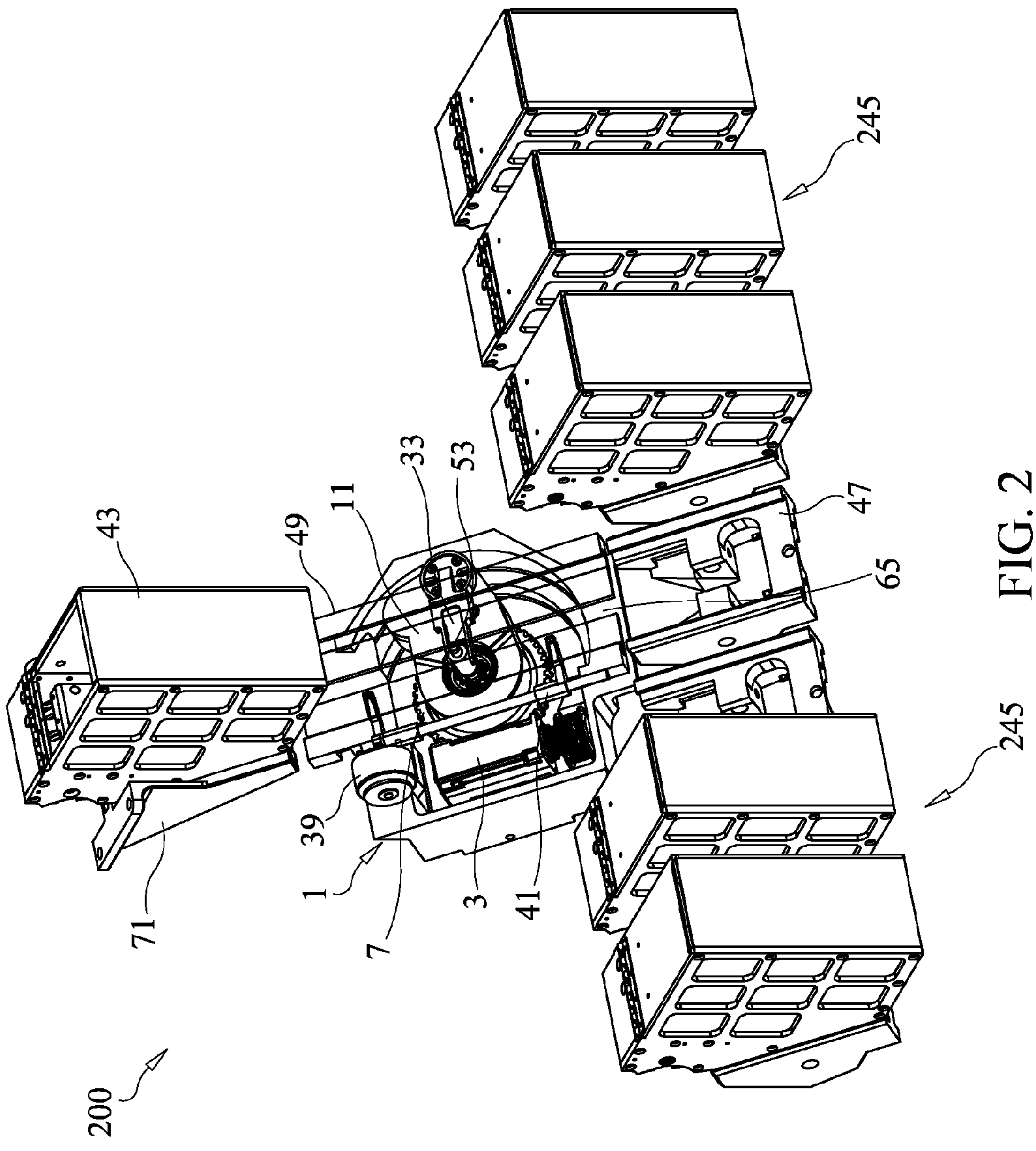
FIG. 2 is a partially transparent, perspective view of another embodiment of a payload storage and transport system, including a transporter, payloads, and a storage assembly which may have a linear shape.

In FIG. 1, the storage assembly 45 may have a curved shape. That is, the retention slots 47 may be arranged in a circular manner. FIG. 2 is a perspective view of another embodiment of a payload storage and transport system 200, including a transporter 1, payloads 43, and a storage assembly 245 which may retention slots 47 arranged in a linear fashion. Mechanisms (not shown in the Figs.) for moving the retention slots 47 of storage assemblies 45, 245 are known. For example, for a curved storage assembly 45, retention slots 47 may be mounted on a large bearing that is attached to a large gear. The large gear may mesh with a small pinion gear. The small pinion gear may be driven by a servo motor.

Figure 3:
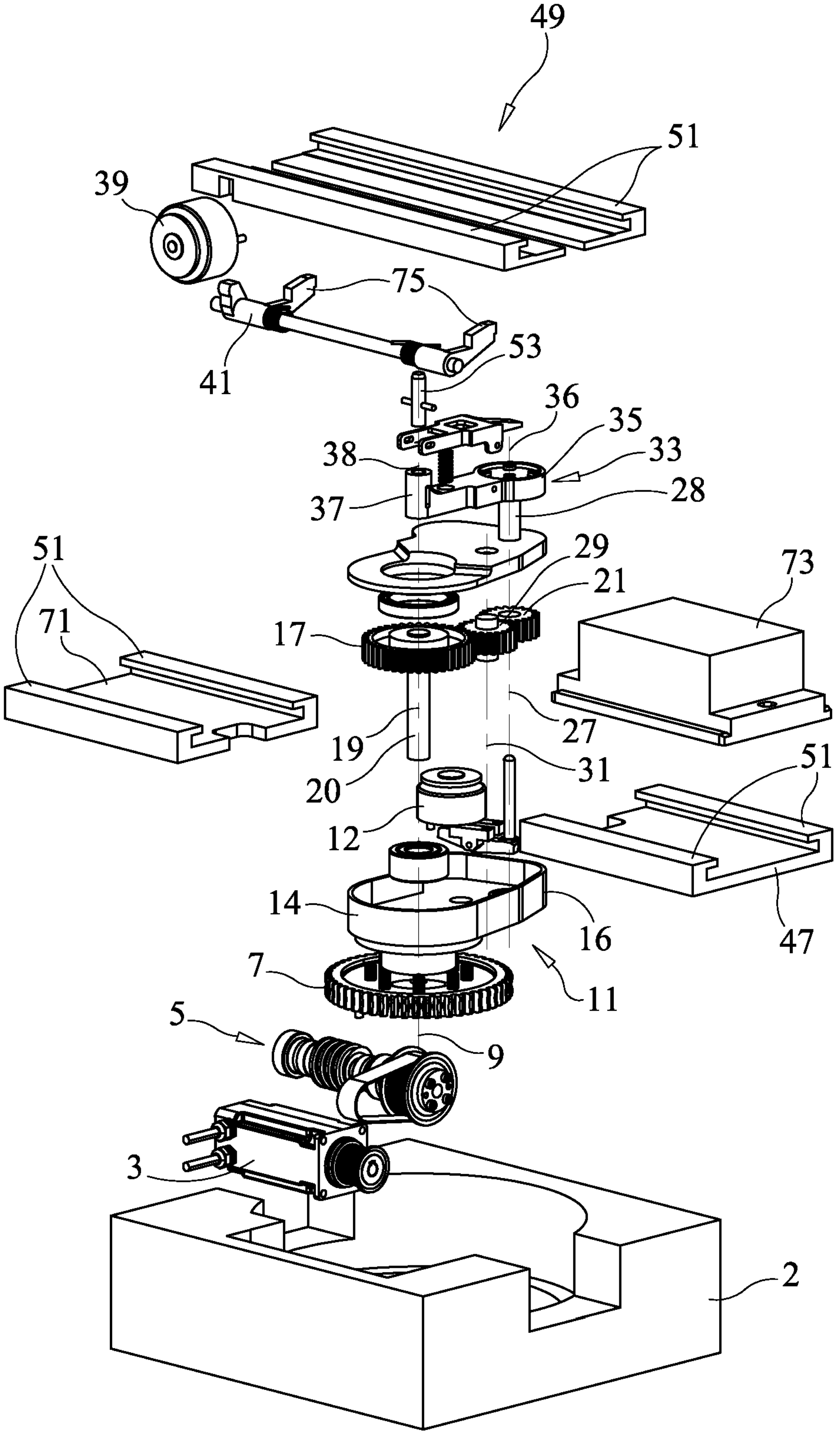
FIG. 3 is an exploded, partial, perspective view of an embodiment of a transporter.
Figure 4:
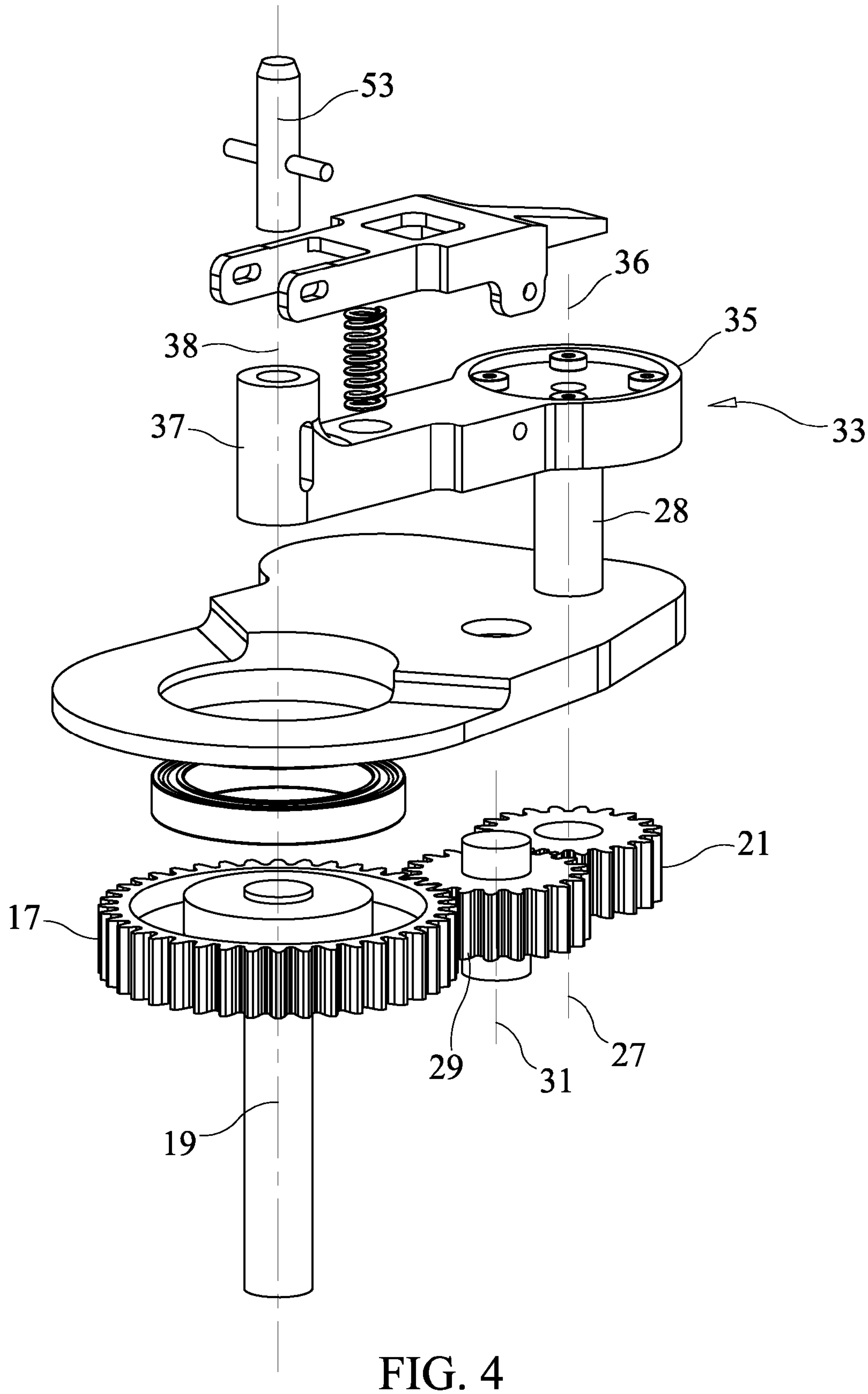
FIG. 4 is an enlarged view of a portion of FIG. 1.
Figure 5:
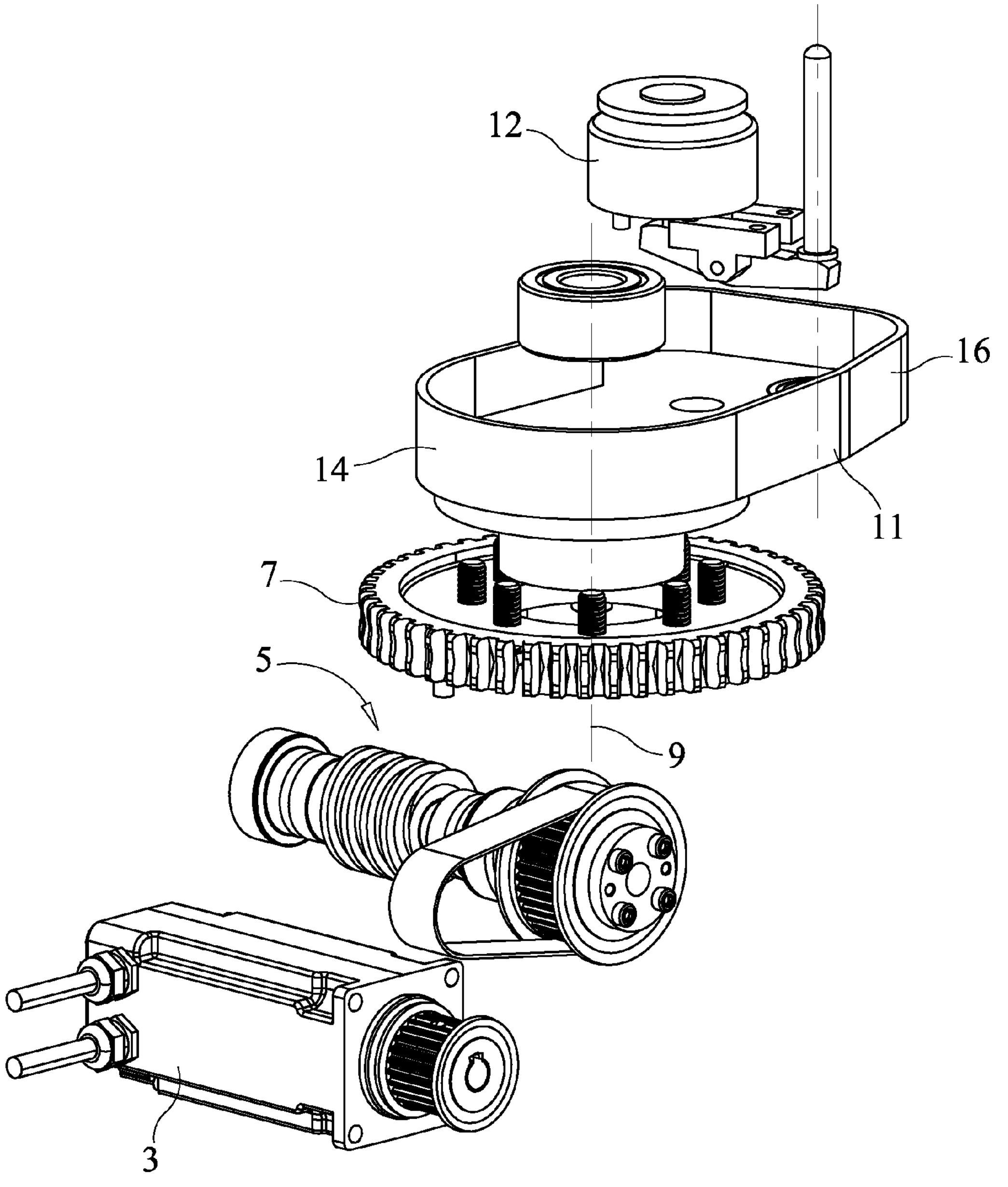
FIG. 5 is an enlarged view of another portion of FIG. 1.
Figure 14B:
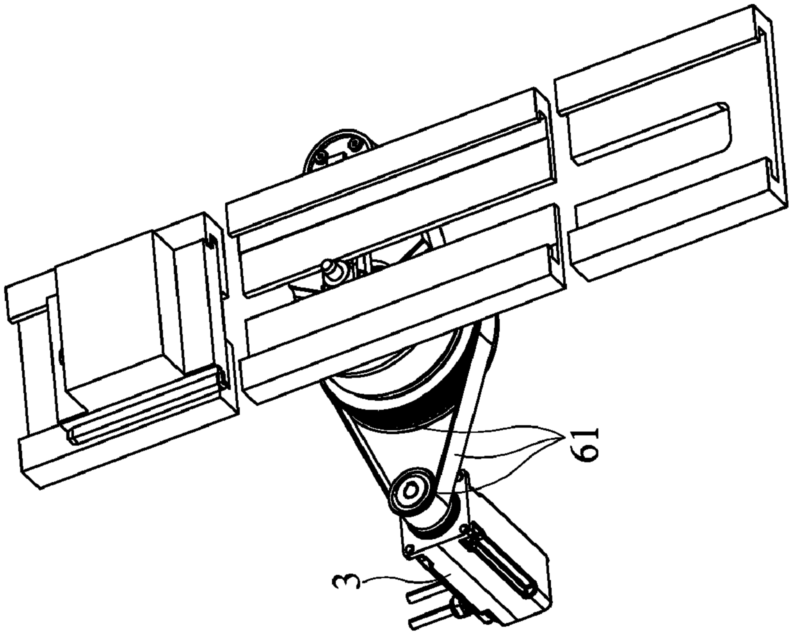
FIGS. 14(*a*)-(*b*) are partially transparent front and perspective views, respectively, of a transporter wherein the motor is connected to the first arm assembly via a belt and sprocket system.
Figure 14A:
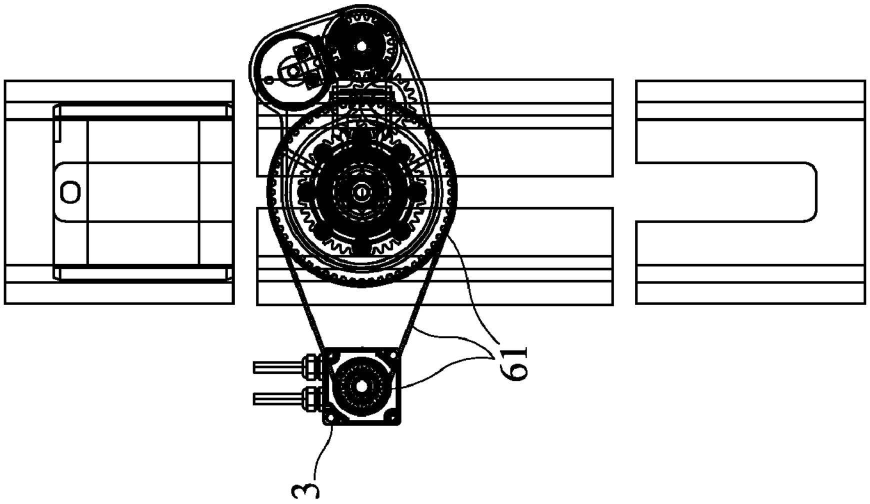
Figure 15B:
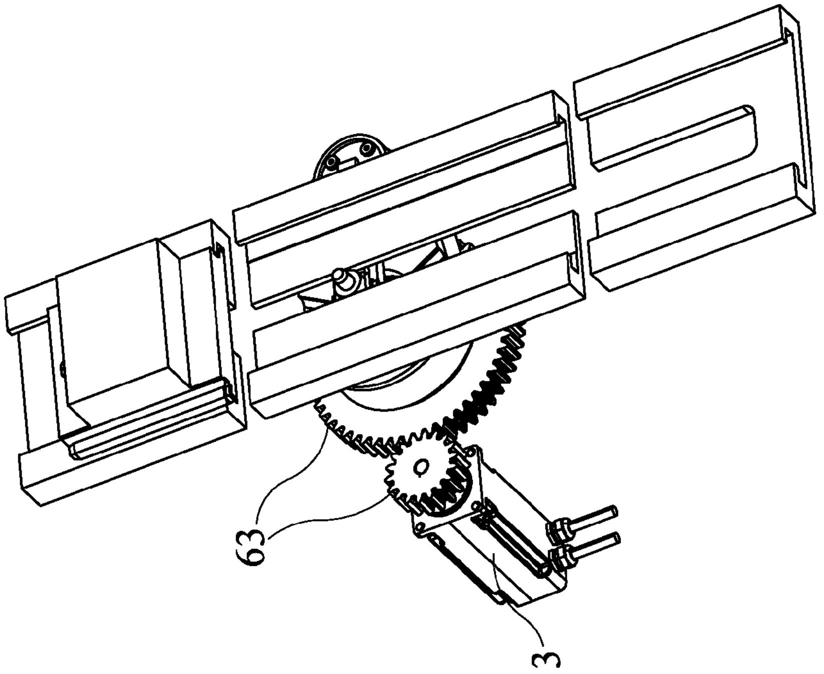
FIGS. 15(*a*)-(*b*) are partially transparent front and perspective views, respectively, of a transporter wherein the motor is connected to the first arm assembly via a spur gear set.
Figure 15A:
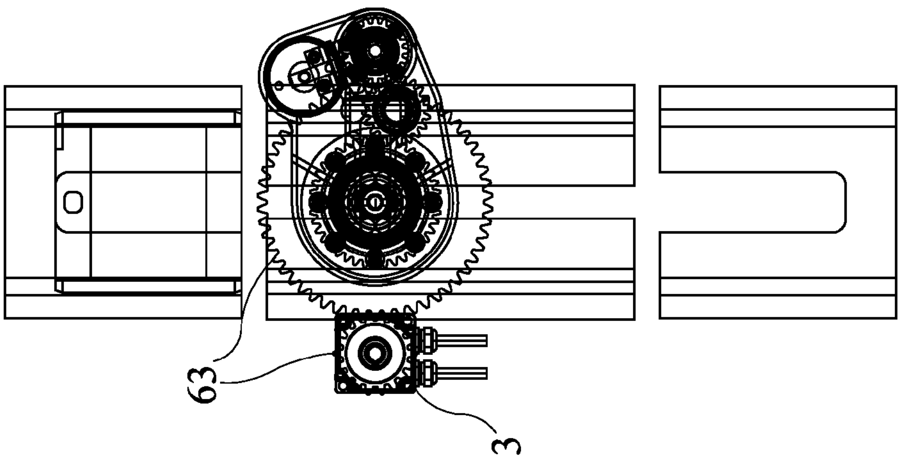

FIG. 3 is an exploded, partial, perspective view of an embodiment of a transporter 1. FIGS. 4 and 5 are enlarged views of portions of FIG. 3. Transporter 1 may include a motor 3. As used herein, "motor" means, for example, an electric, hydraulic or pneumatic motor, or any other type of rotative driver capable of driving (rotating) the worm gear 7. An operator may energize the motor 3 via any wired or wireless means. In one embodiment, the motor 3 may drive a worm 5, which drives the worm gear 7. In another embodiment, the motor 3 may drive the transporter 1 via a belt and sprockets 61, as shown in FIGS. 14(*a*)-(*b*). In a further embodiment, the motor 3 may drive the transporter 1 via a direct geared arrangement 63, as shown in FIGS. 15(*a*)-(*b*).

Referring again to FIGS. 3-5, worm gear 7 may have an axis 9. A first arm assembly 11 may include first and second ends 14, 16. First arm assembly 11 may be rigidly connected to worm gear 7 adjacent end 14 of first arm assembly 11. First arm assembly 11 may include a gear 17 having an axis 19. Gear 17 may be rigidly connected to a stationary base 2 via a shaft 20. Thus, gear 17 may be stationary, with respect to base 2, throughout the operation of the transporter 1.

A gear 21, having an axis 27, may be disposed in rotatable communication with gear 17 via idler gear 29. Idler gear 29, having an axis 31, may be disposed between and engage gears 17 and 21. A second arm assembly 33 may be rigidly connected to gear 21 via shaft 28. The second arm assembly 33 may include first and second ends 35, 37. Rotation of gear 21 may rotate the second arm assembly 33 about its axis 36. This rotation may move the end 37 of the second arm assembly 33 in a circular arc of travel.

Worm 5 may be operable to drive worm gear 7 about its axis 9, thereby rotating the first arm assembly 11. First arm assembly 11 may be rigidly attached to worm gear 7. In one embodiment, worm gear 7 may be formed integrally with the first arm assembly 11. Rotation of the first arm assembly 11 about the axis 19 of gear 17 may rotate idler gear 29, which meshes with and rotates around stationary gear 17. Rotation of the idler gear 29 may thereby rotate the gear 21 in a direction opposite to that of idler gear 29.

Maintaining the distance between the axis 19 of gear 17 and the axis 27 of gear 21 substantially equal to the distance between the axes 36 and 38 of the second arm assembly 33 may enable travel of the axis 38 of the second arm assembly 33 in a linear path. The gear ratio of gear 17 to gear 21 may be 2:1.

Figure 6A:
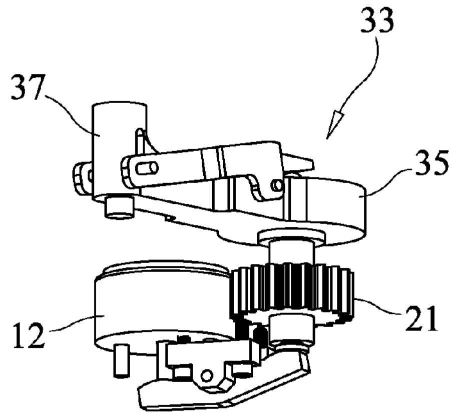
FIGS. 6(*a*)-(*b*) are perspective and partially sectioned perspective views, respectively, of the second arm assembly and a solenoid, wherein the solenoid is energized to retract the payload engager.
Figure 6B:
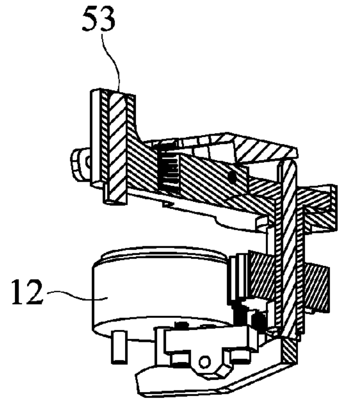
Figure 7A:
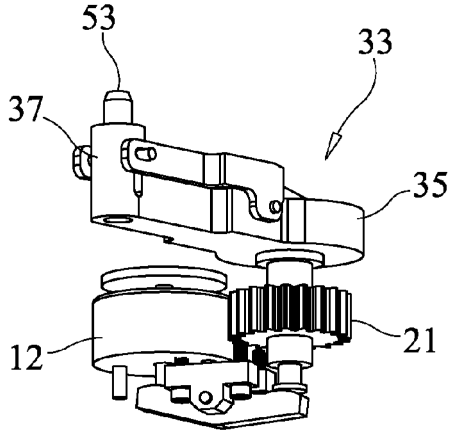
FIGS. 7(*a*)-(*b*) are perspective and partially sectioned perspective views, respectively, of the second arm assembly and a solenoid, wherein the solenoid is de-energized to engage the payload engager with a payload.
Figure 7B:
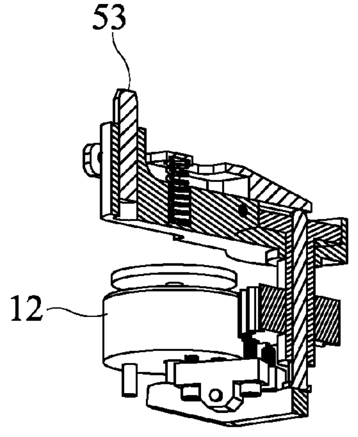

A payload engager 53 may be disposed concentric with the axis 38 of the second arm assembly 33. Payload engager 53 may be extended or retracted via a solenoid 12 to engage and disengage with a payload 43. FIGS. 6(*a*)-(*b*) are perspective and partially cutaway perspective views, respectively, of the second arm assembly 33 and solenoid 12. In FIGS. 6(*a*)-(*b*), the solenoid 12 is energized to retract the payload engager 53. FIGS. 7(*a*)-(*b*) are perspective and partially cutaway perspective views, respectively, of the second arm assembly 33 and solenoid 12. In FIGS. 7(*a*)-(*b*), the solenoid 12 is de-energized to extend the payload engager 53 into engagement with a payload. In one embodiment, the payload engager 53 may be, for example, a pin, as shown in FIGS. 6-7. Payload engager 53 may have a form other than a pin, for example, any form suitable for engaging with a particular payload may be used.

Figure 19B:
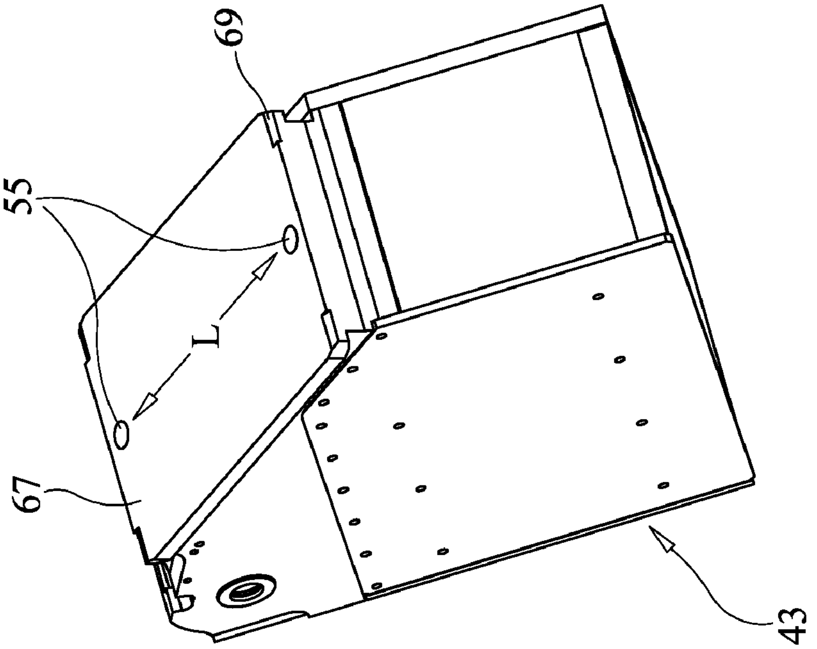
FIGS. 19(*a*)-(*b*) are top and bottom perspective views, respectively, of one embodiment of a payload.
Figure 19A:
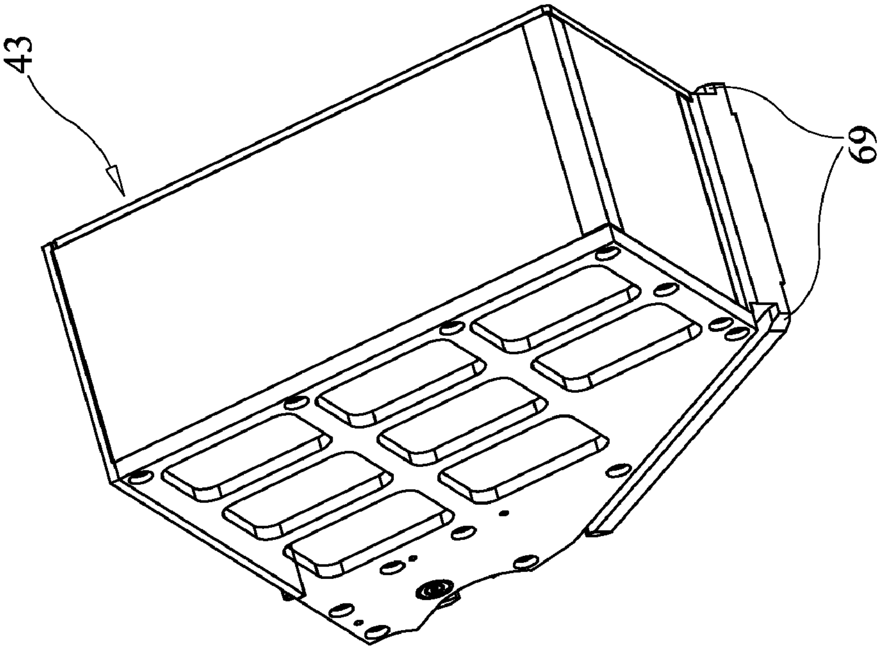

FIGS. 19(*a*)-(*b*) are top and bottom perspective views, respectively, of one embodiment of a payload 43. Payload 43 may include openings 55 formed on an underside 67. Payload engager 53 may engage and disengage openings 55 in payload 43 to move payload 43 along track 49. Payload 43 may include extended edges 69 that slide in rails 51. Payload engager 53 may move in a longitudinal opening 65 (FIG. 1) in track 49.

Figure 8B:
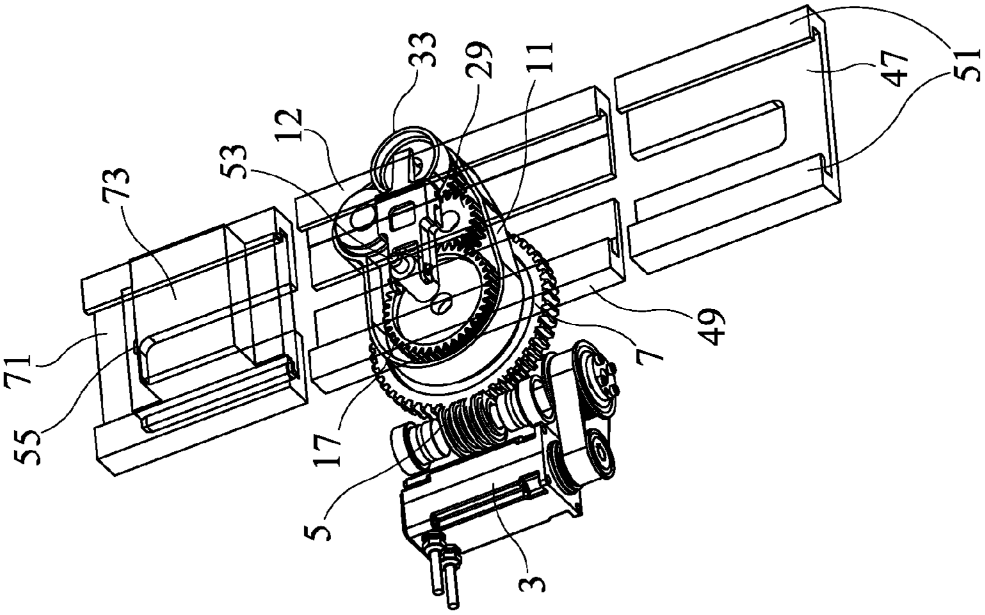
FIGS. 8(*a*)-(*b*) are partially transparent front and perspective views, respectively, of one embodiment of a transporter in a start position.
Figure 8A:
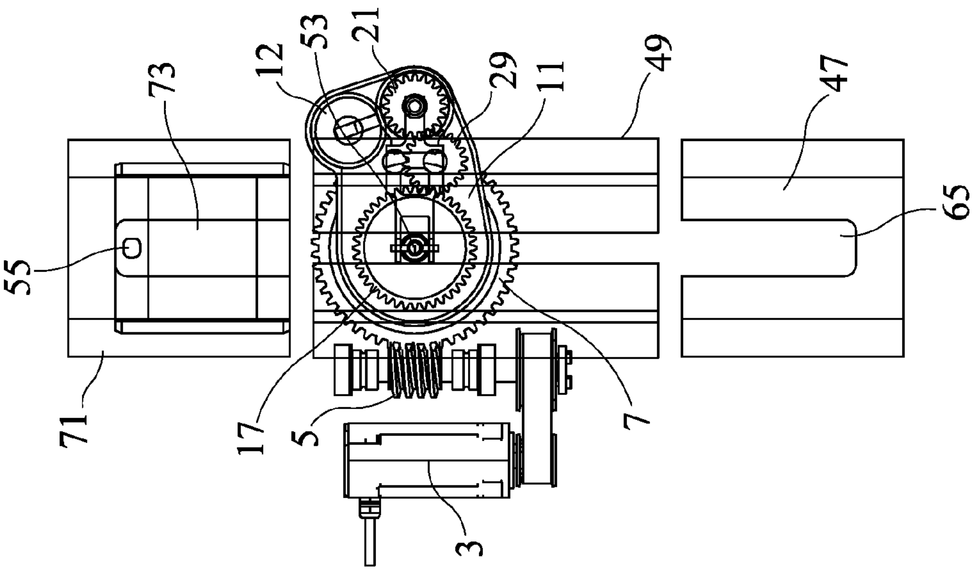

FIGS. 8-11 show positions of transporter 1 when transporting a payload 73 from, for example, a use slot 71 to a retention slot 47. Use slot 71 and retention slot 47 may include longitudinal openings 65 in which the payload engager 53 may move. A start position may be as shown in FIGS. 8(*a*)-(*b*). In the start position, the first and second arm assemblies 11 and 33 may be positioned substantially perpendicular to the direction of travel along the track 49. Payload 73 may be maintained in position in the use slot 71 by a variety of means, for example, a crosspin and solenoid (not shown), ball spring plungers and detents (not shown), etc.

Figure 9B:
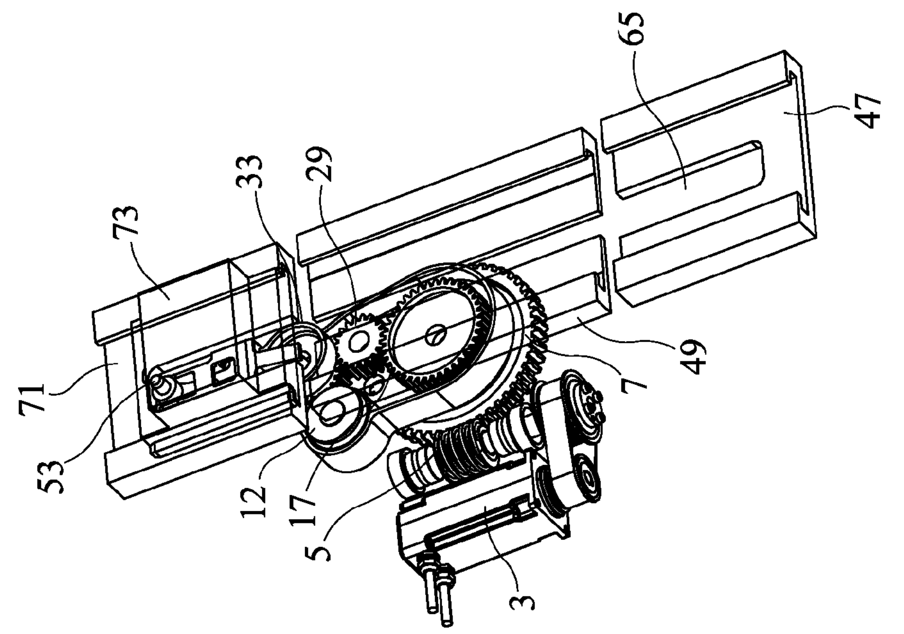
FIGS. 9(*a*)-(*b*) are partially transparent front and perspective views, respectively, of a transporter in a second position, wherein the transporter has been actuated to move the payload engager into engagement with the payload.
Figure 9A:
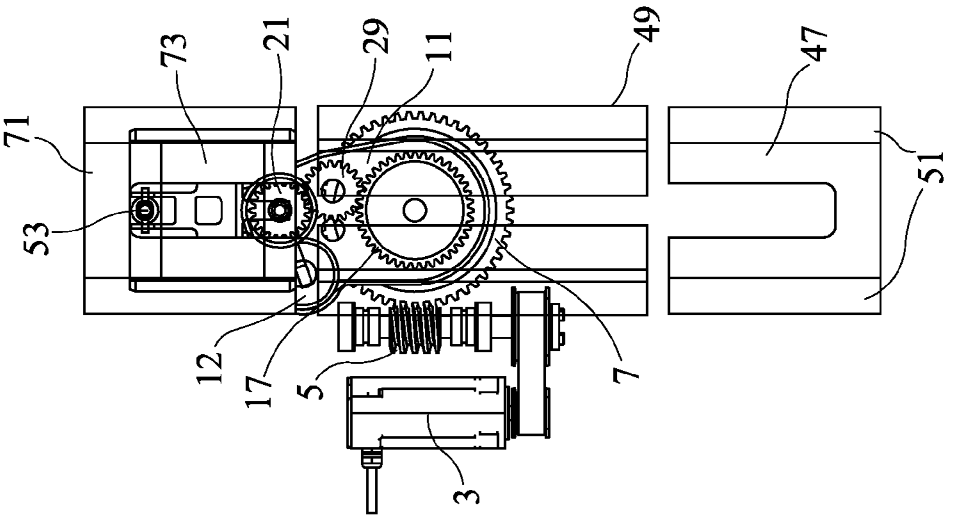

Moving from the start position to a second position shown in FIGS. 9(*a*) and 9(*b*), rotation of worm gear 7 may rotate first arm assembly 11 upwards, thereby rotating gear 21 and second arm assembly 33. Rotation of second arm assembly 33 may cause payload engager 53 to be positioned beneath an opening 55 in payload 73, as in FIGS. 9(*a*)-(*b*). When engager 53 is beneath opening 55, solenoid 12 may be de-energized (see FIGS. 5(*a*)-(*b*)) to thereby engage the payload 73. The second arm assembly 33 may then be parallel to rails 51 and below the user slot 71.

Figure 10B:
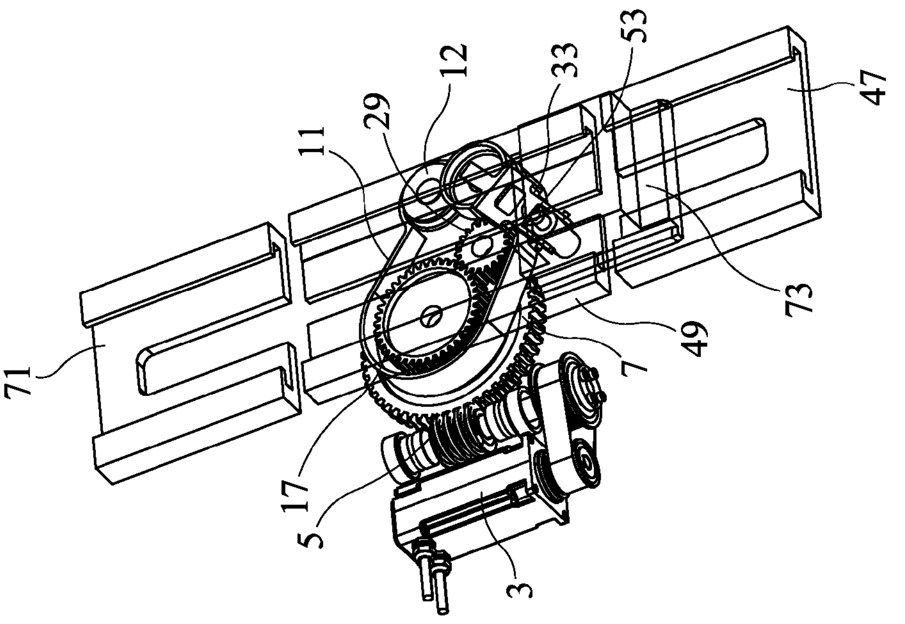
FIGS. 10(*a*)-(*b*) are partially transparent front and perspective views, respectively, of a transporter in a third position, wherein the transporter has moved the payload engager partially down the rails.
Figure 10A:
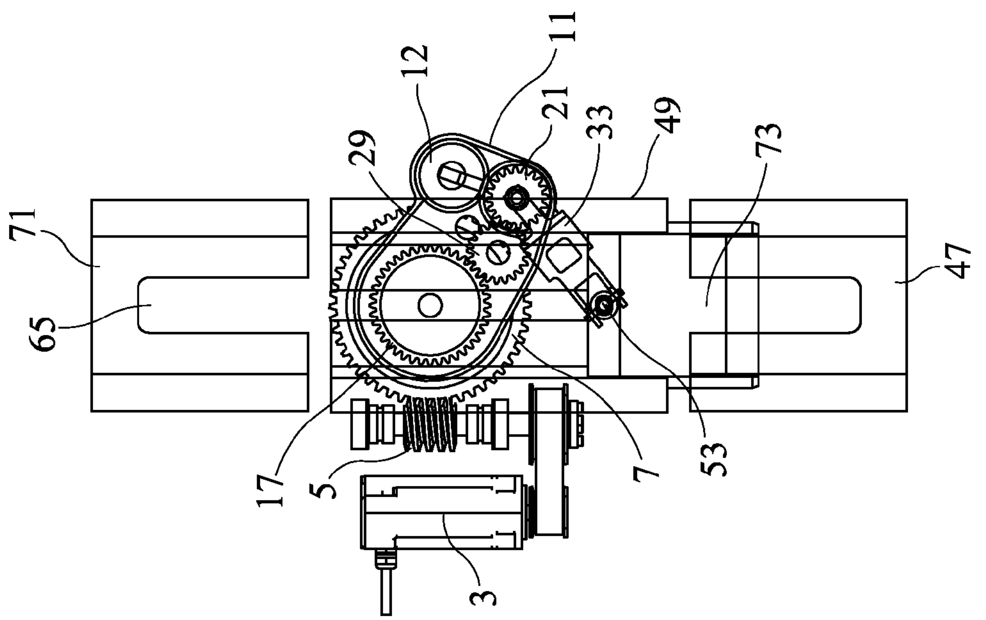
Figure 11B:
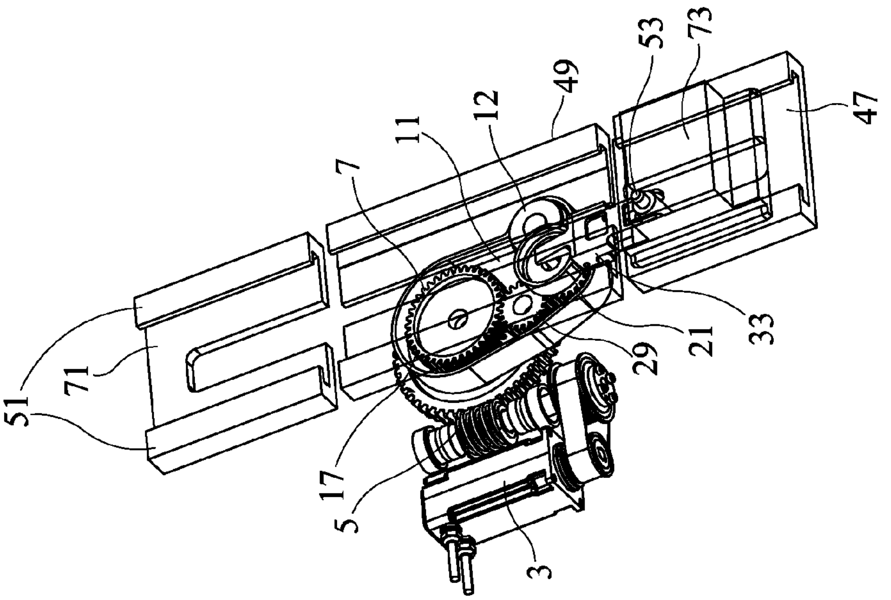
FIGS. 11(*a*)-(*b*) are partially transparent front and perspective views, respectively, of a transporter in an end position, wherein the transporter has moved the payload engager down the rails and into the storage assembly.
Figure 11A:
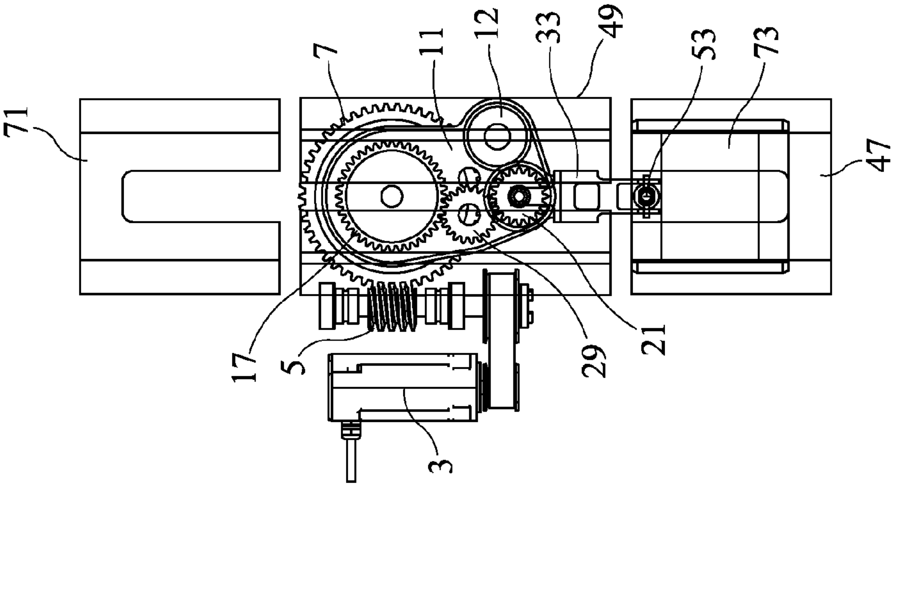

Worm gear 7 may then be rotated in an opposite direction by worm 5, thereby swinging second arm assembly 33 downwards, and causing the payload engager 53 to slide the payload 73 partially down the track 49, as in FIGS. 10(*a*)-(*b*). Worm gear 7 may continue to rotate, causing the second arm assembly 33 to reach a position parallel to rails 51 and adjacent the retention slot 47 at the end of track 49, as in FIGS. 11(*a*)-(*b*).

In FIGS. 8-11, the payload 73 may be moved a distance along the tracks 49 equal to the full range of travel of the payload engager 53. Depending upon the application, it may be desired to move a payload a distance greater than the full range of travel of the payload engager 53. This may be achieved by using a stop mechanism 41 (FIGS. 1-3) to retain the payload along track 49 at a location between the ends of the track 49. Stop mechanism 41 may include one or more supports 75. The payload may bear against a support 75 to thereby retain the payload in a position between the ends of track 49. The stop mechanism may be activated by a second solenoid 39.

When the second solenoid 39 is actuated, the stop mechanism 41 may rotate upwardly so that the supports 75 are adjacent the payload. After the stop mechanism 41 retains the payload, the payload engager 53 may disengage from a first point on the payload. Transporter 1 may then be rotated to move the payload engager 53 to a different location. Then, the payload engager 53 may re-engage with the payload at a second point on the payload. The stop mechanism 41 may then be rotated downward, and the transporter 1 may continue moving the payload along the track 49 until reaching a final position.

As seen in FIGS. 1 and 2, stop mechanism 41 may be disposed adjacent track 49. The solenoid 39 may be disposed in communication with the stop mechanism 41. Solenoid 39 may removably engage the stop mechanism 41 with the payload 43 during travel of the payload 43 along the track 49. Payload 43 may include one or more payload slots 55 (FIG. 19(*b*)) for removable engagement with the payload engager 53. Compared to the distance of travel without a stop mechanism 41, the total distance of travel of the payload 43 may be increased by the distance L (FIG. 19(*b*)) between the payload slots 55.

Figure 12B:
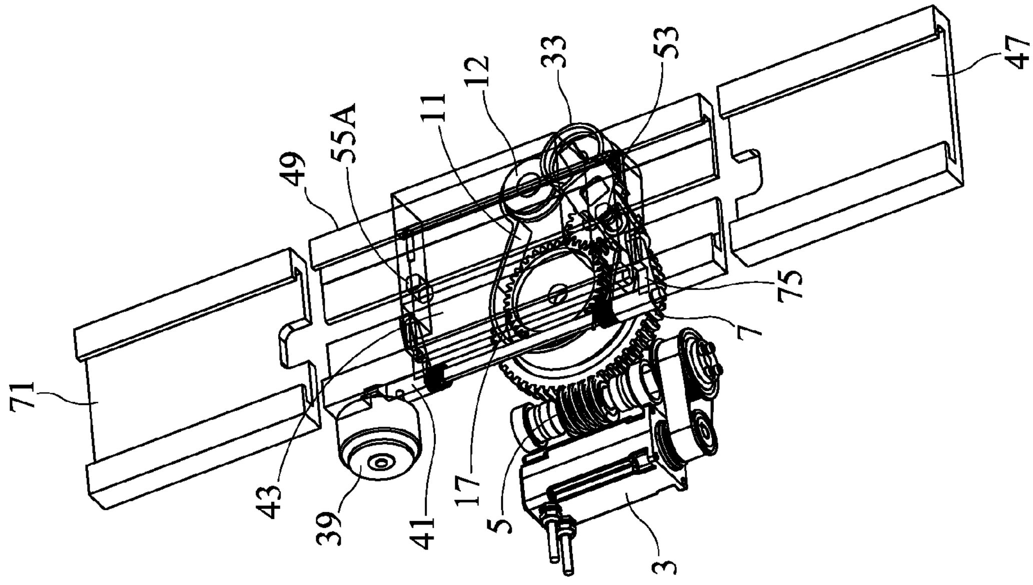
FIGS. 12(*a*)-(*b*) are partially transparent front and perspective views, respectively, of a transporter with a stop mechanism.
Figure 12A:
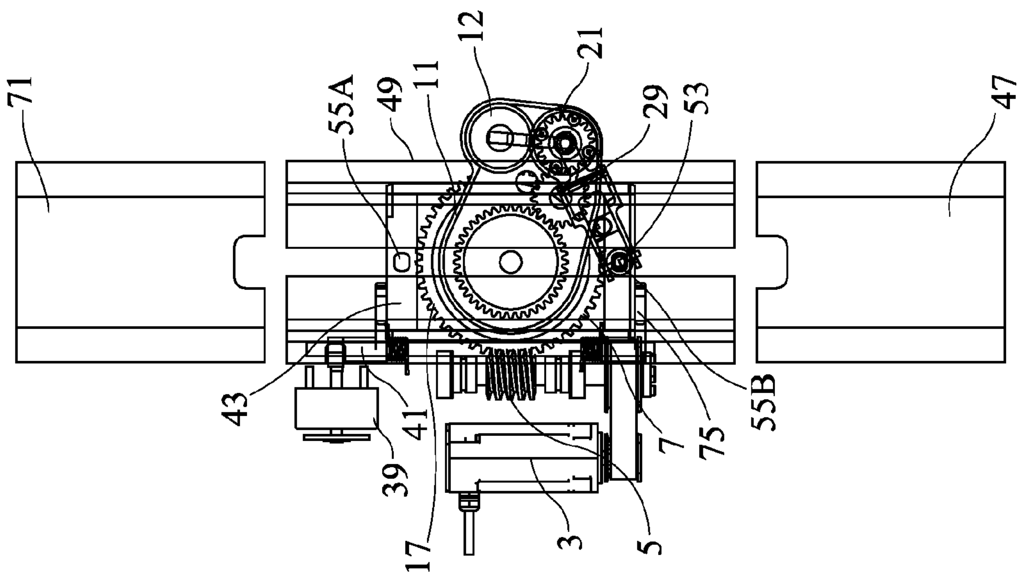

FIGS. 12(*a*)-(*b*) are front and perspective views, respectively, of the transporter 1 that includes a stop mechanism 41 and a solenoid 39 for actuating the stop mechanism 41. In the embodiment of FIGS. 12(*a*)-(*b*), the retention slot 47 and the use slot 71 need not, but may include longitudinal openings 65. The payload engager 53 is in engagement with a lower opening 55B in payload 43. The transporter 1 has moved the payload 43 from a position in the use slot 71 to a position along the track 49, as shown in FIGS. 12(*a*)-(*b*). At this position, the solenoid 39 activates the stop mechanism 41, which rotates upward so that the payload 43 may rest against support 75. Solenoid 12 may now be energized to retract engager 53 from lower opening 55B in payload 43. Transporter 1 may then be rotated to the position shown in FIGS. 13(*a*)-(*b*).

Figure 13B:
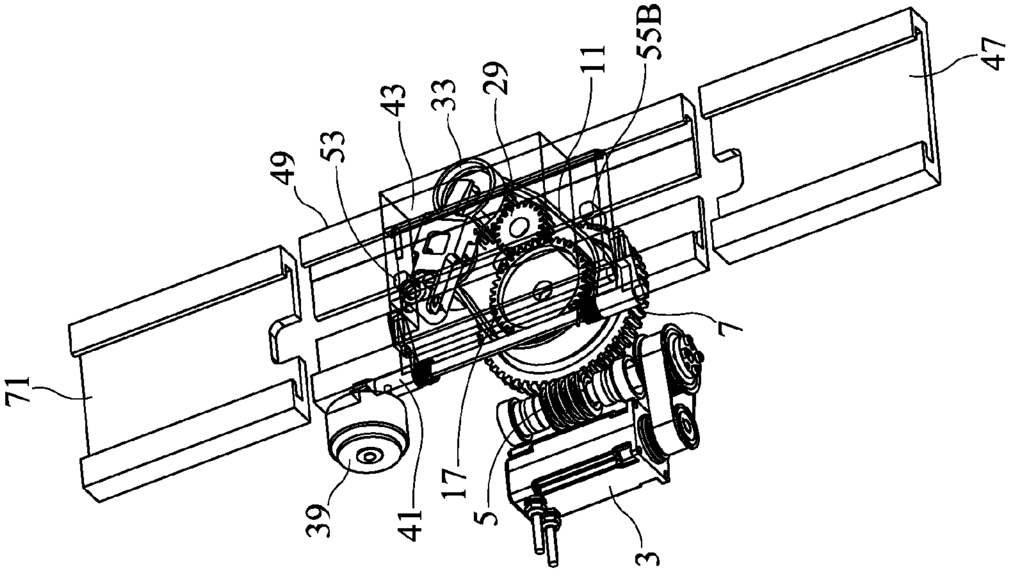
FIGS. 13(*a*)-(*b*) are partially transparent front and perspective views, respectively, of the transporter of FIGS. 12(*a*)-(*b*), wherein the payload engager has disengaged from a first opening on the payload and engaged with a second opening on the payload.
Figure 13A:
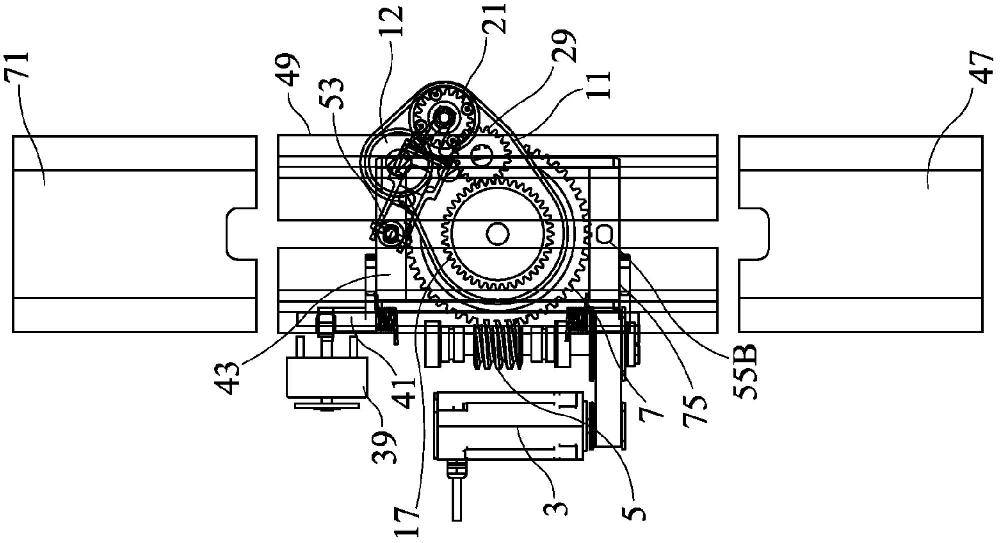

FIGS. 13(*a*)-(*b*) are front and perspective views, respectively, of the transporter of FIGS. 12(*a*)-(*b*). In FIGS. 13(*a*)-(*b*), the payload engager 53 has now engaged with upper opening 55A in payload 43. Stop mechanism 41 may now be rotated downward via solenoid 39 so that supports 75 no longer block the path of travel of payload 43. Then, transporter 1 may be further rotated to move payload 43 to the retention slot 47.

Figure 16A:
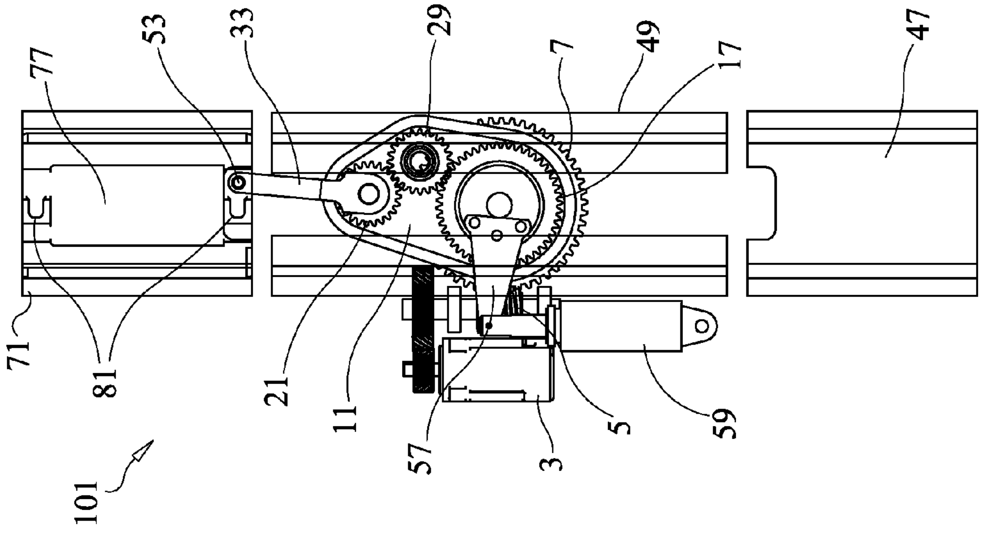
FIGS. 16(*a*)-(*b*) are partially transparent front and perspective views of another embodiment of a transporter wherein the payload engager is about to engage with a payload.
Figure 16B:
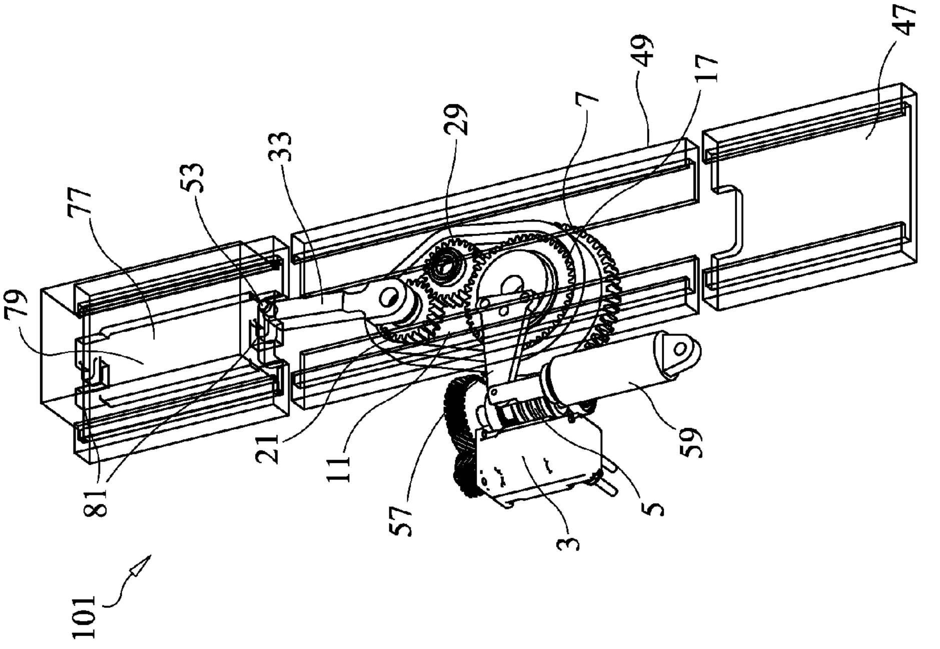
Figure 17B:
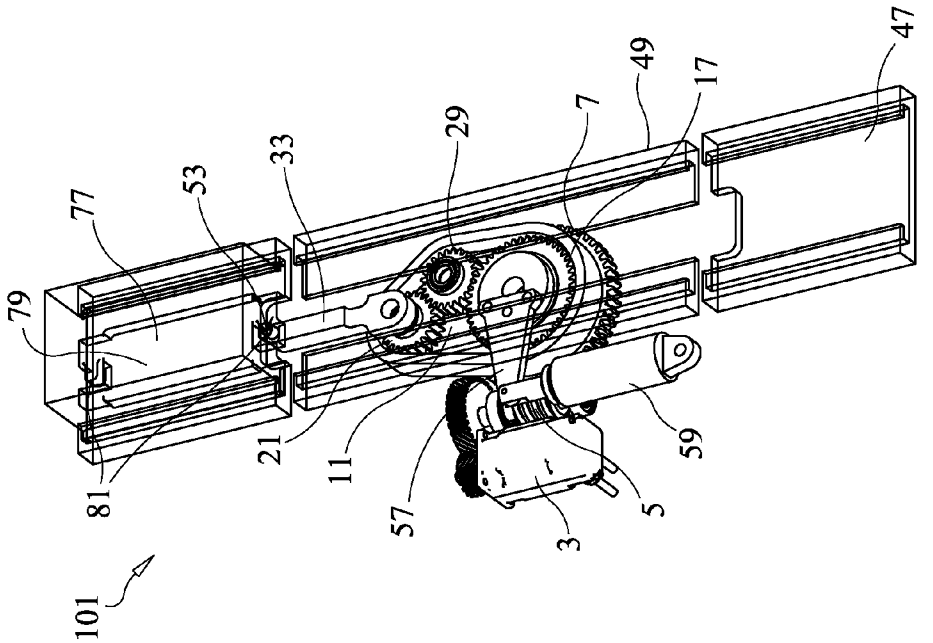
FIGS. 17(*a*)-(*b*) are partially transparent front and perspective views, respectively, of the transporter of FIGS. 16(*a*)-(*b*), wherein the payload engager has engaged with the payload.
Figure 17A:
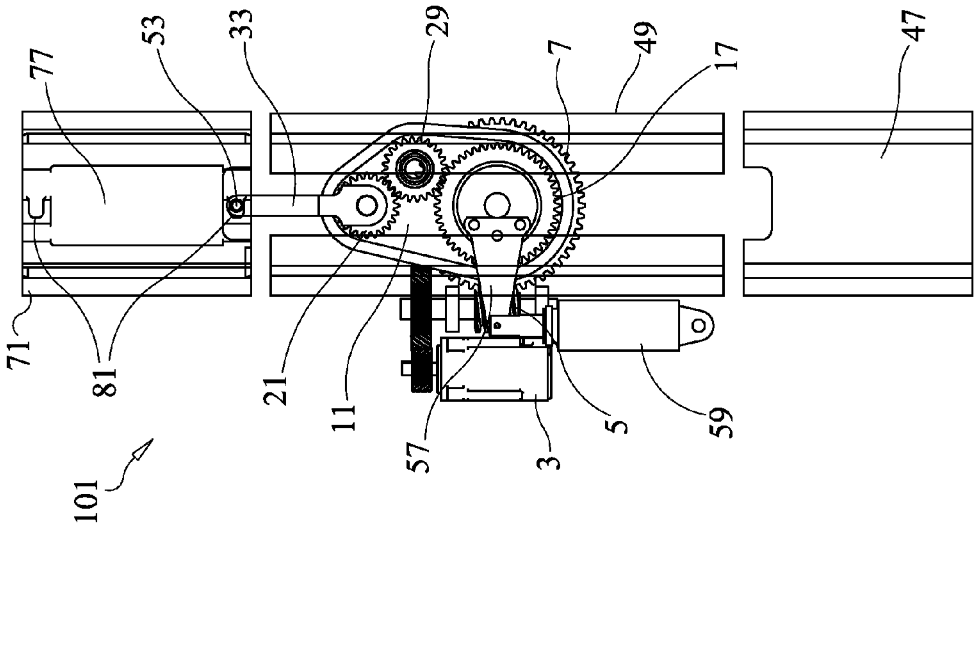
Figure 18B:
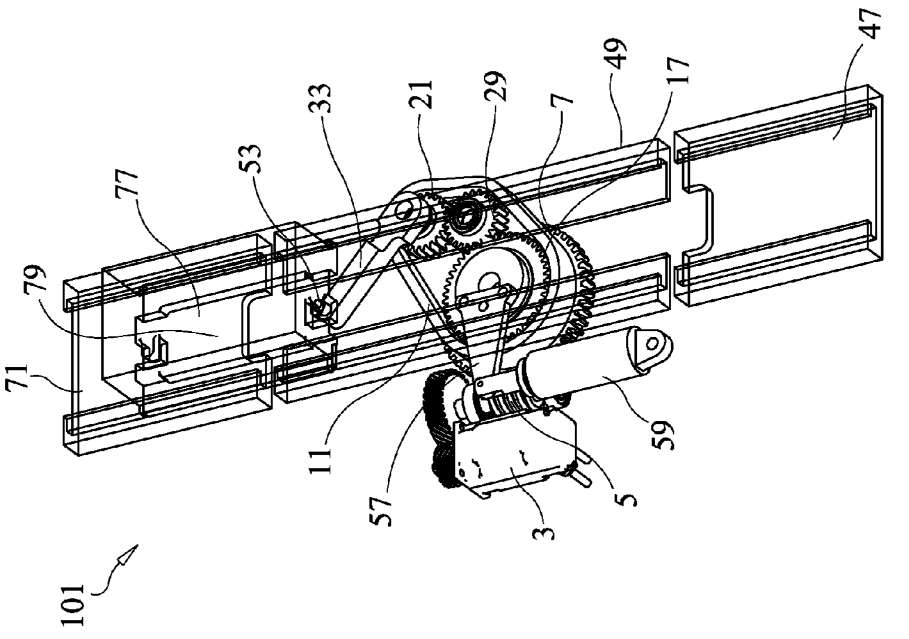
FIGS. 18(*a*) and 18(*b*) are partially transparent front and perspective views, respectively, of the transporter of FIGS. 16(*a*)-(*b*), wherein the payload engager has travelled linearly down the track, resulting in transport of the payload partially down the track.
Figure 18A:
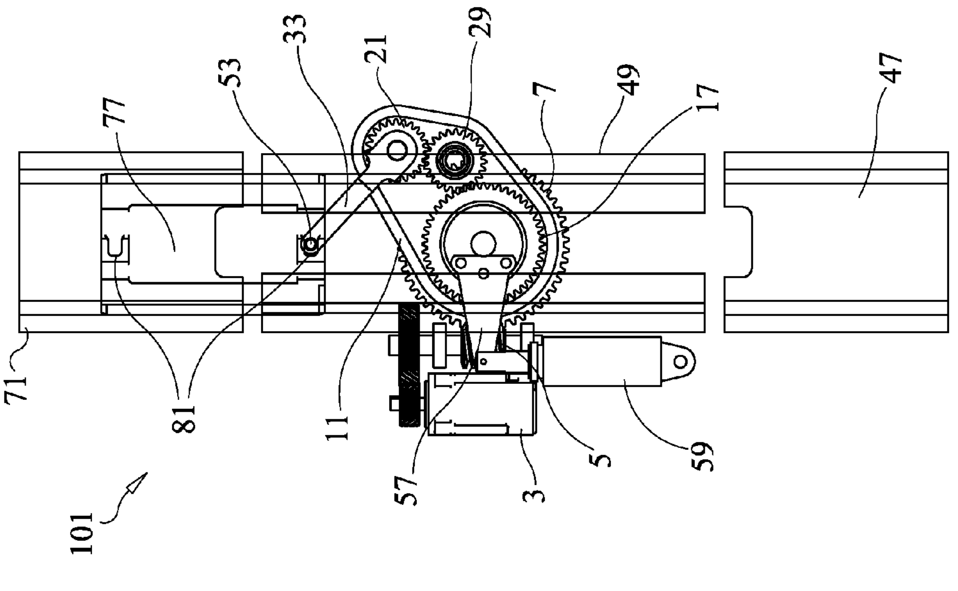

In transporter 1, gear 17 may be rigidly fixed and stationary with respect to stationary base 2 (FIG. 3). That is, gear 17 may not move or rotate with respect to base 2. In another embodiment, gear 17 may rotate with respect to base 2. That is, gear 17 may be rigidly fixed to shaft 20 and shaft 20 may rotate with respect to base 2. FIGS. 16-18 show an embodiment of a transporter 101 in which gear 17 may rotate with respect to base 2.

Transporter 101 may include an actuator 59 that may rotate gear 17 via a drive arm 57. Actuator 59 is shown in FIGS. 16-18 as a linear actuator, but, a rotational actuator, such as motor, could also be used. Actuator 59 may control movement of second arm assembly 33 independent of the movement of first arm assembly 11. In this manner, the payload engager 53 may move not only parallel to rails 51, but also lateral to rails 51.

FIGS. 16(*a*)-(*b*) show a payload 77 having a recessed bottom surface 79 with slots 81 formed therein. Because payload engager 53 of transporter 101 may move laterally, payload engager 53 may slide into and out of slots 81 to engage and disengage payload 77. Thus, in transporter 101, solenoid 12 is not needed because there is no need to move payload engager 53 "up and down", that is, in the direction normal to the plane of FIG. 16(*a*).

As shown in FIGS. 16(*a*)-(*b*), drive arm 57 may be attached at one end to gear 17 and at the other end to actuator 59. Using the actuator 59, gear 17 may rotate about its axis 19. Actuator 59 may rotate gear 17 via the drive arm 57 to slide the payload engager 53 into a slot 81 on the bottom of the payload 77, as seen in FIGS. 17(*a*)-(*b*). Actuator 59 and gear 17 may remain in the position shown in FIGS. 17(*a*)-(*b*), and the motor 3 may then rotate the worm gear 7. Rotation of the worm gear 7 may rotate the first arm assembly 11, thereby rotating the idler gear 29 and the gear 21. Gear 21 may then rotate the second arm assembly 33, such that the payload engager 53 may move the payload 77 down the track 49, as shown in FIGS. 18(*a*)-(*b*).

Transporters 1, 101 are linear transport systems that are compact and may move a payload over a relatively large distance. The amount of space required by the transporters 1, 101 at the ends of its range of movement (use slot 71 and retention slot 47) is minimal. There is no permanent intrusion of the transporters 1, 101 into the areas of the use slot 71 and the retention slot 47. In a "home" position, where the first and second arm assemblies 11, 33 are perpendicular to the linear path of movement of a payload, the mechanisms of the transporters 1, 101 may be totally contained within a volume between the use slot 71 and the retention slot 47. Thus, the volume available for the use slot 71, retention slot 47, and their associated mechanisms is greater than in other linear transport systems.

The stop mechanism 41 increases the transport distance even more. The stop mechanism 41 further reduces the presence of the transporter mechanism into the areas at either end of its movement. The openings 55 (FIG. 19*b*) in payload 43 may be located at the ends of the payload 43, rather than the midsection of the payload 43. Thus, the second arm assembly 33 does not have to extend very far under the payload 43 to engage an opening 55 in the payload 43. This is the case whether the payload 43 is in the use slot 71 or the retention slot 47.

The lateral motion of the payload engager 53 of transporter 101 simplifies the construction of the first and second arm assemblies 11, 33. That is, the solenoid 12 and its associated linkages, that may be part of transporter 1, may not be required in transporter 101.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A transporter for moving a payload along a linear path, comprising:

a stationary base;

a first arm assembly including a first gear coupled to the stationary base, an idler gear that meshes with the first gear, and a second gear that meshes with the idler gear, the first and second gear including parallel axes and a gear ratio of the first gear to the second gear being 2:1;

a driver for rotating the first arm assembly around the axis of the first gear;

a second arm assembly rigidly coupled to the second gear such that rotation of the second gear rotates the second arm assembly around the axis of the second gear, the second arm assembly including a third axis that is parallel to the axes of the first and second gears wherein a distance between the first gear axis and the second gear axis is a same distance as a distance between the second gear axis and the third axis; and a payload engager disposed at the third axis, for engaging and disengaging the payload.

2. The transporter of claim 1, further comprising a solenoid for actuating the payload engager.

3. The transporter of claim 1, wherein the payload engager comprises a pin.

4. The transporter of claim 1, further comprising a track that defines the linear path.

5. The transporter of claim 1, wherein the first gear is rigidly coupled to, and stationary with respect to, the stationary base.

6. The transporter of claim 1, wherein the first gear is rotatable with respect to the stationary base.

7. The transporter of claim 4, further comprising a stop mechanism disposed adjacent the track and operable to retain the payload in a position between ends of the track.

8. The transporter of claim 7, wherein the stop mechanism includes at least one support, the payload bearing against the support in the retained position.

9. The transporter of claim 8, further comprising a solenoid for actuating the stop mechanism.

10. The transporter of claim 6, further comprising an actuator for rotating the first gear.

11. The transporter of claim 10, wherein the actuator moves the second arm assembly independently of movement of the first arm assembly.

12. The transporter of claim 11, wherein the payload engager moves laterally with respect to the linear path of the payload.

13. A payload storage and transport system, comprising:

the transporter of claim 4; and a storage assembly disposed adjacent the transporter, the storage assembly including at least one retention slot disposed at a first end of the track.

14. The payload storage and transport system of claim 13, further comprising a use slot disposed at a second end of the track, the transporter being operable to move the payload along the track between the retention slot and the use slot, and vice versa.

15. The payload storage and transport system of claim 14, wherein the payload comprises an ammunition container.

* * * * *